(12) United States Patent
Slattery

(10) Patent No.: US 12,190,390 B2
(45) Date of Patent: *Jan. 7, 2025

(54) ON-DEMAND INSURANCE FOR VEHICLE SHARING

(71) Applicant: Rivian IP Holdings, LLC, Irvine, CA (US)

(72) Inventor: Michael P. Slattery, Irvine, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/212,291

(22) Filed: Jun. 21, 2023

(65) Prior Publication Data

US 2023/0334582 A1    Oct. 19, 2023

Related U.S. Application Data

(63) Continuation of application No. 17/313,501, filed on May 6, 2021, now Pat. No. 11,720,972.

(51) Int. Cl.
| | |
|---|---|
| *G06Q 40/08* | (2012.01) |
| *B60R 25/24* | (2013.01) |
| *G07C 9/23* | (2020.01) |
| *B60R 25/31* | (2013.01) |
| *B60R 25/34* | (2013.01) |

(52) U.S. Cl.
CPC ............. *G06Q 40/08* (2013.01); *B60R 25/24* (2013.01); *G07C 9/23* (2020.01); *B60R 25/31* (2013.01); *B60R 25/34* (2013.01)

(58) Field of Classification Search
CPC ........... G06Q 40/08; G07C 9/23; B60R 25/24
USPC .............................................. 705/4
See application file for complete search history.

(56) References Cited

U.S. PATENT DOCUMENTS

| | | | |
|---|---|---|---|
| 5,325,291 A * | 6/1994 | Garrett ................... | G06Q 99/00 705/4 |
| 6,233,563 B1 * | 5/2001 | Jefferson ................ | G06Q 40/08 705/4 |
| 8,712,803 B1 * | 4/2014 | Buentello .............. | G06Q 40/08 705/35 |
| 2004/0111330 A1 | 6/2004 | Stanton | |

(Continued)

OTHER PUBLICATIONS

List of references cited in corresponding U.S. Appl. No. 17/313,501.

*Primary Examiner* — Robert R Niquette
(74) *Attorney, Agent, or Firm* — BAKERHOSTETLER

(57) ABSTRACT

Systems, vehicles, and methods for ensuring an insurance policy is in place to cover use of a vehicle by an authorized user. A computing device associated with the vehicle executes computer-executable instructions to determine an identity of a user seeking to operate the vehicle and whether an insurance policy associated with the vehicle covers operation of the vehicle by the user. Responsive to a determination that the user is not associated with the insurance policy covering the use of the vehicle, operation of the vehicle by the user is enabled in response to a further determination that the user is covered by an existing insurance policy associated with the user that provides coverage for the operation of the vehicle by the user and an on-demand insurance policy secured by the user that provides coverage for the operation of the vehicle by the user.

18 Claims, 13 Drawing Sheets

(56) References Cited

U.S. PATENT DOCUMENTS

| | | | |
|---|---|---|---|
| 2008/0027761 A1* | 1/2008 | Bracha | G06Q 40/00 |
| | | | 705/4 |
| 2010/0114612 A1* | 5/2010 | Stanton | G06Q 40/08 |
| | | | 705/4 |
| 2020/0027167 A1* | 1/2020 | Harris | B42D 25/305 |
| 2022/0270176 A1 | 8/2022 | Chintakindi | |
| 2023/0334582 A1* | 10/2023 | Slattery | B60R 25/24 |

* cited by examiner

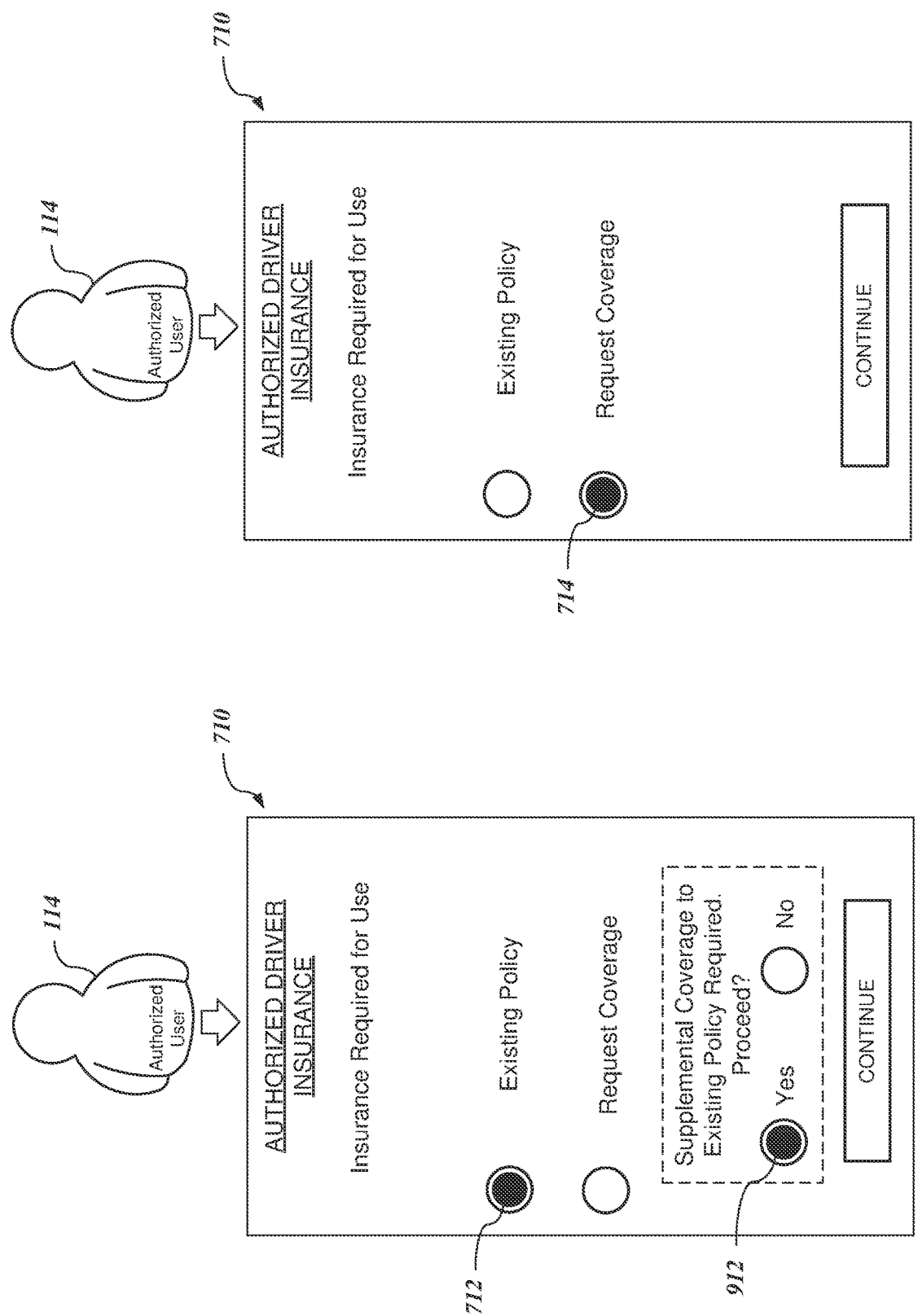

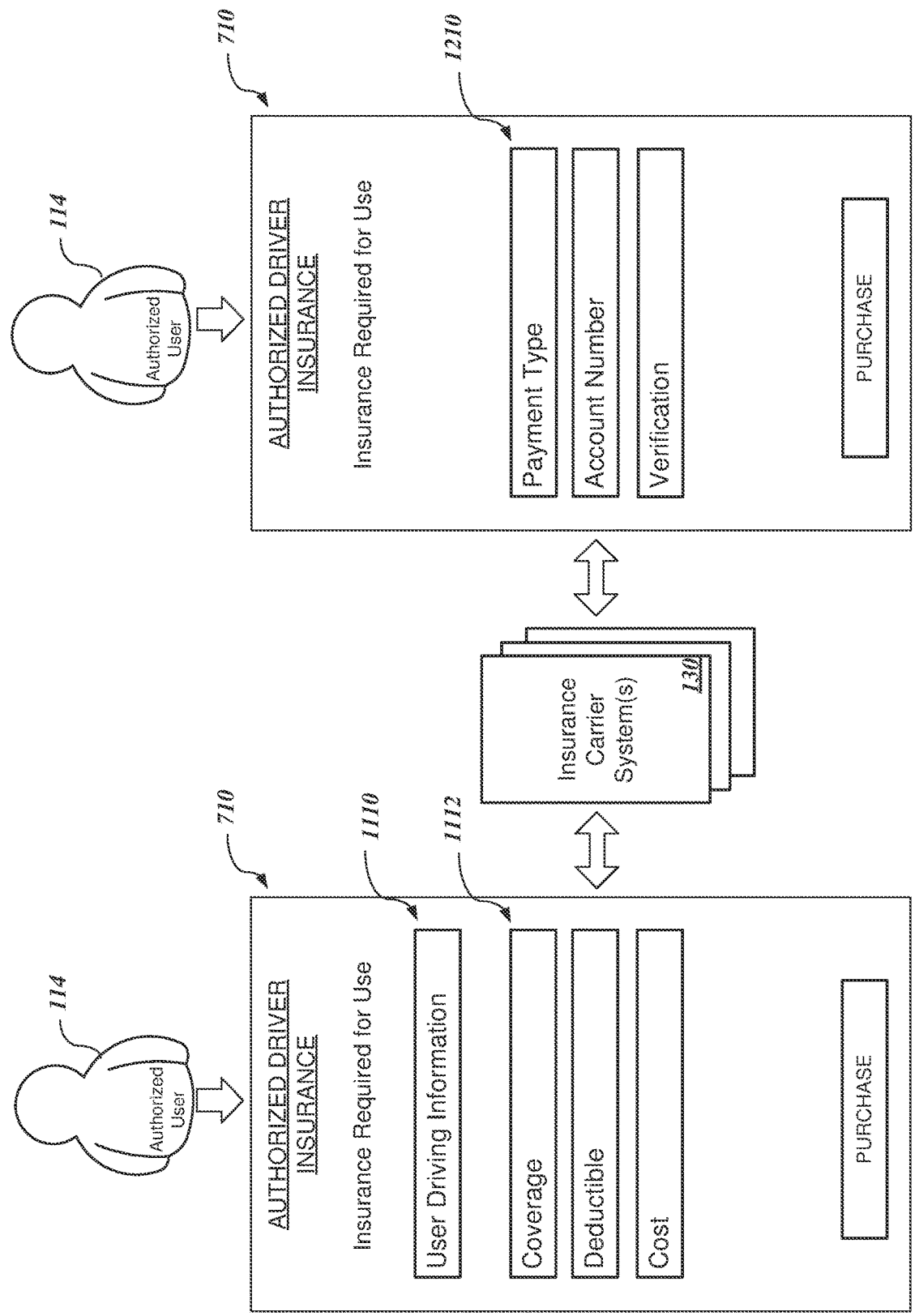

ON-DEMAND INSURANCE FOR VEHICLE SHARING

CROSS-REFERENCE TO RELATED APPLICATION

The present disclosure is a continuation of co-pending U.S. patent application Ser. No. 17/313,501, filed on May 6, 2021, and entitled "ON-DEMAND INSURANCE FOR VEHICLE SHARING," the contents of which are incorporated in full by reference herein.

INTRODUCTION

In general, vehicle insurance policies are associated with particular vehicles rather than with particular drivers. As a result, if the driver borrows a vehicle from another vehicle owner, the driver is likely covered by the vehicle owner's insurance policy, which may lead to undesirable consequences. For example, if the borrowed vehicle is involved in a collision or another incident from which damages and/or injuries result, the vehicle owner's insurance policy may be held accountable for resulting damages.

BRIEF SUMMARY

Disclosed embodiments include systems, vehicles, and methods for covering a driver by insurance when an owner of the vehicle permits the driver to operate the vehicle.

In an illustrative embodiment, a system includes a computing device associated with a vehicle and having computer-readable media configured to store computer-executable instructions to perform processes. An identity is determined of a user seeking to operate the vehicle. A determination is made whether an insurance policy associated with the vehicle covers operation of the vehicle by the user. Responsive to a determination that the user is not associated with the insurance policy covering the use of the vehicle, operation of the vehicle is enabled responsive to a determination that the user is covered by an additional insurance policy chosen from an existing insurance policy associated with the user that provides coverage for the operation of the vehicle by the user and an on-demand insurance policy that provides coverage for the operation of the vehicle by the user.

In another illustrative embodiment, a vehicle includes a vehicle body. A cabin is configured to receive contents chosen from at least one occupant and cargo. A drive system is configured to motivate, accelerate, decelerate, stop, and steer the vehicle. A computing device associated with the vehicle includes computer-readable media configured to store computer-executable instructions to perform processes. An identity is determined of a user seeking to operate the vehicle. A determination is made whether an insurance policy associated with the vehicle covers operation of the vehicle by the user. Responsive to a determination that the user is not associated with the insurance policy covering the use of the vehicle, operation of the vehicle is enabled responsive to a determination that the user is covered by an additional insurance policy chosen from an existing insurance policy associated with the user that provides coverage for the operation of the vehicle by the user and an on-demand insurance policy that provides coverage for the operation of the vehicle by the user.

In a further illustrative embodiment, a computer-implemented method is provided. An identity is determined of a user seeking to operate a vehicle. A determination is made whether an insurance policy associated with the vehicle covers operation of the vehicle by the user. Responsive to a determination that the user is not associated with the insurance policy covering the use of the vehicle, operation of the vehicle is enabled responsive to a determination that the user is covered by an additional insurance policy chosen from an existing insurance policy associated with the user that provides coverage for the operation of the vehicle by the user and an on-demand insurance policy that provides coverage for the operation of the vehicle by the user.

Further features, advantages, and areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way. The components in the figures are not necessarily to scale, with emphasis instead being placed upon illustrating the principles of the disclosed embodiments. In the drawings:

FIGS. 7-12 are screen diagrams of an authorization control system that enables an authorized user to procure supplemental or on-demand insurance to use a vehicle;

DETAILED DESCRIPTION

The following description is merely illustrative in nature and is not intended to limit the present disclosure, application, or uses. It will be noted that the first digit of three-digit reference numbers and the first digit of four-digit reference numbers correspond to the figure number in which the element first appears.

The following description explains, by way of illustration only and not of limitation, various embodiments of enabling verification and/or securing of vehicle insurance to cover temporary use of a vehicle.

By way of a non-limiting introduction and overview, in various embodiments a system associated with a vehicle is configured to determine an identity of a user seeking to operate the vehicle and whether an insurance policy associated with the vehicle covers the user's operation of the vehicle. If it is determined that the user is not associated with the insurance policy covering the use of the vehicle, operation of the vehicle may be permitted when the user is covered by an additional insurance policy. The additional insurance policy may be an existing insurance policy associated with the user that provides coverage for the operation of the vehicle by the user or an on-demand insurance policy secured by the user to provide coverage for the user's operation of the vehicle. Thus, an owner (or other individual that controls use of the vehicle can), for example, restrict use of the vehicle to persons intended to be covered by the owner's policy or a person whose use is covered by his own policy or is able to arrange a supplemental or on-demand policy to cover the user; the system may facilitate the user's procurement of the on-demand policy.

Now that a general overview has been given, details of various embodiments will be explained by way of non-limiting examples given by way of illustration only and not of limitation.

Figure 1:
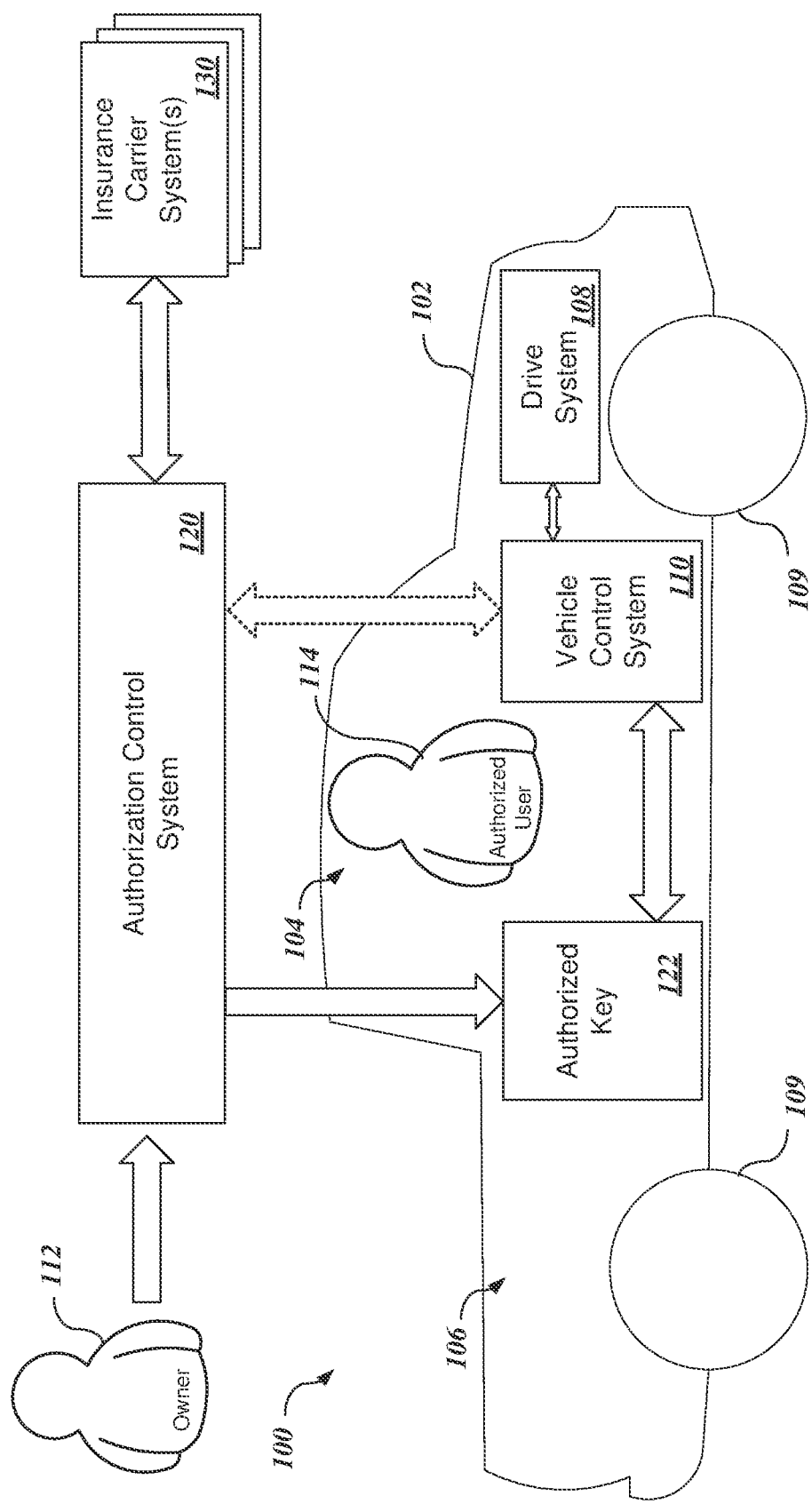
FIG. 1 is a side plan view of a vehicle including a system for controlling access by an authorized user.

Referring to FIG. 1, in various embodiments a vehicle 100 has a body 102 that incorporates a cabin 104 that accommodates a payload that includes occupants and/or cargo. In various embodiments, the body 102 also includes a cargo area 106 separate from the cabin 104, such as a truck bed or trunk, where additional cargo may be carried. The vehicle 100 also includes a drive system 108 that is operably coupled with wheels 109 to accelerate, decelerate, steer, brake, or otherwise motivate the vehicle 100. In various embodiments, the drive system 108 includes at least one electric motor, an internal combustion engine, or a hybrid motor/engine to provide motive force to the wheels 109, and may also include drive train and/or transmission systems to convey rotational force from the motor and/or engine to the wheels 109. The drive system 108 also may include steering systems to guide the wheels 109, as well as a braking system to slow the wheels 109 and/or to recapture energy from the rotating wheels 109 to provide electrical energy to one or more batteries or other power cells (not expressly shown) included in the drive system 108. In various embodiments, the vehicle 100 also includes a vehicle control system 110 that controls operation of the vehicle 100 including, but not limited to, controlling access to operate the vehicle 100.

In various embodiments, presenting an authorized key 122 for verification by the vehicle control system 110 is a requirement to be able to operate the vehicle 100. The authorized key 122, as further described below, may include a key or key fob, or another device that provides an authorization that may be verified by the vehicle control system 110. An authorized key 122 may be possessed and/or allocated by an owner 112 of the vehicle 100. In various embodiments, for purposes of this description, one or more owners 112 has legal control of the vehicle 100. The owner 112 may be an actual legal owner of the vehicle 100 (owning the vehicle outright or subject to a lien of an entity financing purchase of the vehicle 100), a lessee of the vehicle 100, or another person in whom control of the vehicle 100 is vested, such as an employee given control of a company car, a renter of a car, etc. It will be appreciated that the owner 112 may be one of multiple owners of the vehicle 100, such as a domestic couple or a business entity (for which one or more persons may be tasked with control of the vehicle 100). According to various embodiments, in addition to the owner 112 of the vehicle 100, there may be regular, preauthorized users of the vehicle 102, such as a spouse, domestic partner, employee, and/or child of the owner 112. These other users (not shown in FIG. 1) may be authorized to operate the vehicle 100, but, according to various embodiments, only the owner 112 can actually authorize these other users to operate the vehicle.

For purposes of this example, it is assumed that spouses, children, employees, etc., as regular users of the vehicle 100, are included in insurance policies that cover the ordinary use of the vehicle 100. However, on occasion, the owner 112 of the vehicle 100 may wish to authorize another user to operate the vehicle 100 but only on the condition that the user has his or her own insurance coverage that will cover their use of the vehicle 100 or is willing to secure such coverage. The owner 112 may not require such coverage for limited uses, such as by a valet or a mechanic. Thus, the stipulation that insurance coverage be provided by the user may be limited to select users of the vehicle 100.

When the owner 112 wishes to permit an authorized user 114 to operate the vehicle 100 subject to demonstrating or securing insurance coverage, the owner may access an authorization control system 120, as further described below. Using the authorization control system 120, the owner 112 may provide the authorized key 122 to an authorized user 114 to enable the authorized user 122 to be able to operate the vehicle 100. The authorized key 122, as described further below, may be a physical device, such as a key fob, or a code providable to a smartphone or other device that may be carried and presented to the vehicle control system 110 the authorized user 114. The authorized key 122 may be presented to the vehicle control system 110 by being brought within proximity of the vehicle control system 110 by, for example, inserting the authorized key 122 in a key receptacle (not shown in FIG. 1), by bringing the authorized key 122 into the cabin 104 of the vehicle 100 or otherwise bringing the authorized key 122 into proximity of the vehicle control system 110 where the vehicle control system 110 can verify the authentication of the authorized key 122.

As previously described, however, a condition of permitting the authorized user 122 to use the vehicle 100 may be that the authorized user 114 verify insurance coverage or secure insurance coverage to cover his or her operation of the vehicle 100. If the authorized user 114 has insurance coverage that will cover his or her use of the vehicle 100, the authorized user 114 will provide policy information to the authorization control system 120. The authorization control system 120 will then verify the coverage through an insurance carrier system 130. Alternatively, if the authorized user 114 does not have coverage that will cover his or her use of the vehicle 100, via the authorization control system 120, the authorized user 114 may obtain coverage from the insurance carrier systems 130.

In various embodiments, an interface is included in the vehicle control system 110 that may enable the owner 112 to grant authorization to use the vehicle 100 to the authorized user 114. Similarly, the authorized user 114 may use an interface (not shown in FIG. 1) of vehicle control system 110 to present policy information to permit verification of coverage. Additionally or alternatively, the owner 112 and/or the authorized user 114 may access the authorization control system 120 via computing devices such as smartphones or other computing devices with communications capabilities (not shown in FIG. 1).

In various embodiments, the authorization control system 120 may configure the authorized key 122 for acceptance by the vehicle control system 110 when the insurance coverage of the authorized user 114 (pre-existing or presently-secured) is verified. The authorized key 122 may become activated upon such verification and/or the vehicle control system 110 may accept the authorized key 122 only after it receives verification from the authorization control system 120. In various embodiments, the verification of insurance coverage (pre-existing or presently-secured) is desirably received via the authorization control system 120 to be able to directly verify the existence of the coverage rather than relying, for example, on a statement or assurance from the authorized user 114 that could prove to be inaccurate.

Figure 2:
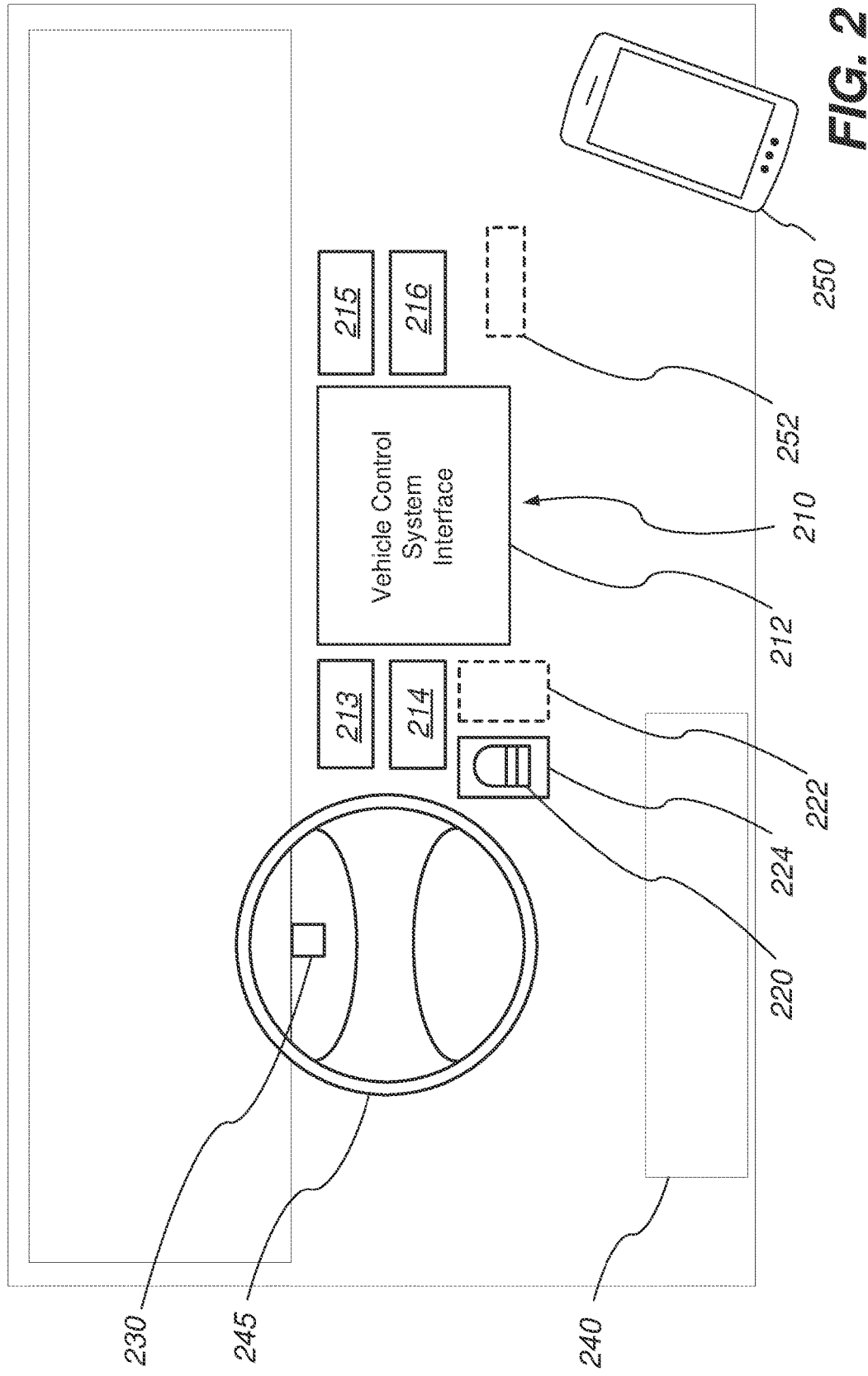
FIG. 2 is a perspective view of a cabin of the vehicle of FIG. 1.

Referring additionally to FIG. 2, in various embodiments the cabin 104 of the vehicle 100 (FIG. 1) includes a vehicle control system interface 210 that enables interaction with the vehicle control system 110 (FIG. 1). The vehicle control system interface 210 may include a display 212 and a number of inputs 213-216 that enable a user to interact with the vehicle control system interface 210. It will be appreciated that the display 212 may include a touchscreen or receive voice commands to enable user interaction with the vehicle control system interface 210 instead of or in addition to by using the inputs 213-216. The owner 112 or the authorized user 114 (FIG. 1) may use the vehicle control system interface 210 to interact with the authorization control system 120 to facilitate authorization of the authorized user 114 and/or to verify or arrange insurance coverage for the authorized user 114. Additionally or alternatively, a smartphone or other computing device 250 may be used with the vehicle control system 110 via a device interface 252 to enable the owner 112 and/or the authorized user 114 to interact with the vehicle control system 110 to facilitate authorization of the authorized user 114 and/or to verify or arrange insurance coverage for the authorized user 114. The smartphone or other computing device 250 also may be able to communicate directly with the authorization control system 120 to facilitate authorization of the authorized user 114 and/or to verify or arrange insurance coverage for the authorized user 114.

Once the authorization of the authorized user 114 and the verification of pre-existing or presently-secured coverage are completed, the authorized key 122 may become active and/or recognized by the vehicle control system 110 to permit the authorized user 114 to operate the vehicle 100. As previously stated, the authorized key 122 may include a key fob 220 that is recognizable by a key fob sensor 222. The key fob sensor 222 may be configured to recognize the key fob 220 when the key fob 220 is inserted into a receptacle 224 or brought within proximity of the key fob sensor 222, such as by being carried into the cabin 104 of the vehicle 100. It will be appreciated that the key fob 220 may or may not include or be integrated with an actual mechanical key; the nature of the key fob 220 is not limited to any particular form.

As also previously stated, the authorized key 122 may include a portable computing device 250, such as a smartphone, smartwatch, fitness tracker, or other computing device that may include a code presentable to and/or readable by the vehicle control system 110 to enable operation of the vehicle 100. Thus, in response to being detected and/or successfully interrogated via a device interface 252, the portable computing device 250 may provide verification that the authenticated user 114 is authorized to operate the vehicle 100. The portable computing device 250 may include any device capable of receiving and/or presenting a code that may be used to identify the authorized user 114 to the vehicle control system 110.

In various embodiments, the cabin 104 may also include additional instrumentation usable to record or verify the identity of a person seeking to operate the vehicle 100. The vehicle control system 110 may be configured to verify that a would-be operator includes the owner 112, the authorized user 114, or another person authorized to operate the vehicle 100. The instrumentation may be used to record or compare characteristics of a person seeking to operate the vehicle 100 with available or previously-captured data regarding the operator. For example, a camera or other imaging device 230 may be positioned to image the operator (not shown). Capturing image data of the operator may be part of the process of the owner 112 enabling the authorized user 114 to use the vehicle 100. An image of the authorized user 114 may be captured by the camera 230 as part of the authorization process, or an image may be collected using the owner's smartphone or another device. The image may then be compared to image data collected by the camera 230 when the authorized user 114 seeks to operate the vehicle 100. Similarly, when a person operates the vehicle 100, selected positions of an operator's seat 240, a repositionable steering wheel 245, or other positionable apparatuses may be compared to positions of these apparatuses used by permitted users to verify or further verify the identity of the person seeking to operate the vehicle 100. Thus, for example, when a person possessing the key fob 220 or the smartphone encoded to be that of the owner 112 or the authorized user 114 seeks to operate the vehicle 100, the vehicle control system 110 may first capture data from the camera 230 or one of the other apparatuses. The captured data may then be compared to previously-captured or recorded data to ensure that the individual presenting the key fob 220 or the smartphone 250 is the person to whom authorization to use the vehicle 100 has been granted.

Figure 3:
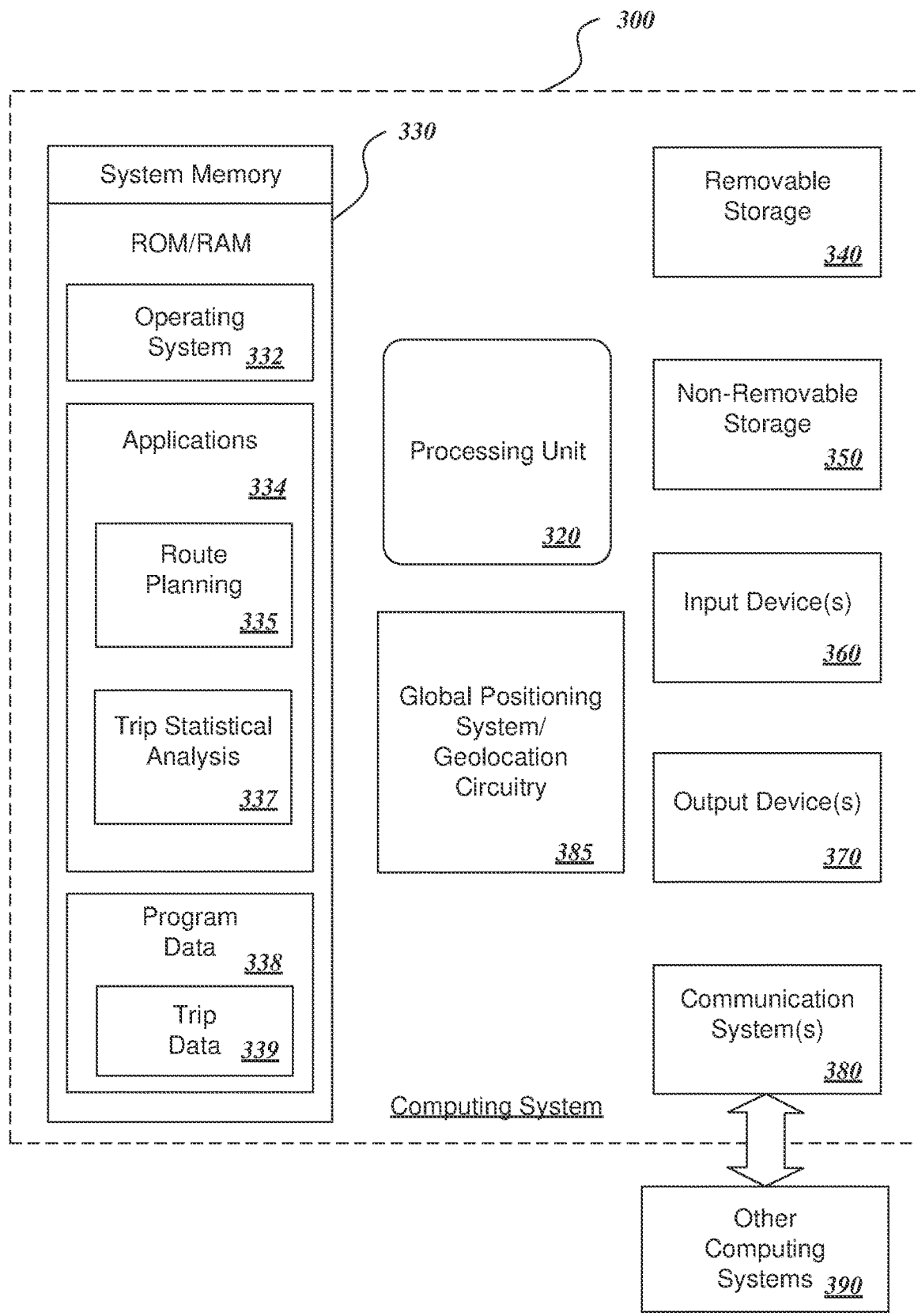
FIG. 3 is a block diagram of an illustrative computing system for performing functions of the systems of FIG. 1.

Referring additionally to FIG. 3, and given by way of example only and not of limitation, some form of a generalized computing system 300 may be used for the vehicle control system 110 of the vehicle 100, the authorization control system 120, the insurance carrier system(s) 130 (FIG. 1), the portable computing device 250 (FIG. 2), other computer systems. In various embodiments, the computing system 300 typically includes at least one processing unit 320 and a system memory 330. Depending on the exact configuration and type of computing system, the system memory 330 may be volatile memory, such as random-access memory ("RAM"), non-volatile memory, such as read-only memory ("ROM"), flash memory, and the like, or some combination of volatile memory and non-volatile memory. The system memory 330 typically maintains an operating system 332, one or more applications 334, and program data 338. The operating system 332 may include any number of operating systems executable on desktop or portable devices including, but not limited to, Linux, Microsoft Windows®, Apple OS®, or Android®, or a proprietary operating system.

The computing system 300 may also have additional features or functionality. For example, the computing system 300 may also include additional data storage devices (removable and/or non-removable) such as, for example, magnetic disks, optical disks, tape, or flash memory. Such additional storage is illustrated in FIG. 3 by removable storage 340 and non-removable storage 350. Computer storage media may include volatile and non-volatile, removable and non-removable media implemented in any method or technology for storage of information, such as computer-readable instructions, data structures, program modules or other data. The system memory 330, the removable storage 340, and the non-removable storage 350 are all examples of computer storage media. Available types of computer storage media include, but are not limited to, RAM, ROM, EEPROM, flash memory (in both removable and non-removable forms) or other memory technology, CD-ROM, digital versatile disks (DVD) or other optical storage, magnetic cassettes, magnetic disk storage or other magnetic storage devices, or any other medium which can be used to store the desired information and which can be accessed by the computing system 300. Any such computer storage media may be part of the computing system 300.

The computing system 300 may also have input device(s) 360 such as a keyboard, mouse, stylus, voice input device, touchscreen input device, etc. Output device(s) 370 such as a display, speakers, printer, short-range transceivers such as a Bluetooth transceiver, etc., may also be included. The computing system 300 also may include one or more communication systems 380 that allow the computing system 300 to communicate with other computing systems 390, as further described below. Available forms of communication media typically carry computer-readable instructions, data structures, program modules or other data in a modulated data signal such as a carrier wave or other transport mechanism and includes any information delivery media. The term "modulated data signal" may include a signal that has one or more of its characteristics set or changed in such a manner as to encode information in the signal. By way of illustrative example only and not of limitation, communication media may include wired media such as a wired network or direct-wired connection, and wireless media such as acoustic, radio frequency (RF), infrared and other wireless media. The term computer-readable media as used herein includes both storage media and communication media.

In further reference to FIG. 3, the computing system 300 may include global positioning system ("GPS") circuitry 385 that can automatically discern its location based on relative positions to multiple GPS satellites. As described further below, GPS circuitry 385 may be used to determine a location and generate data about acceleration, speed, braking, turning, and other movement of the vehicle 100 (FIG. 1).

Figure 4:
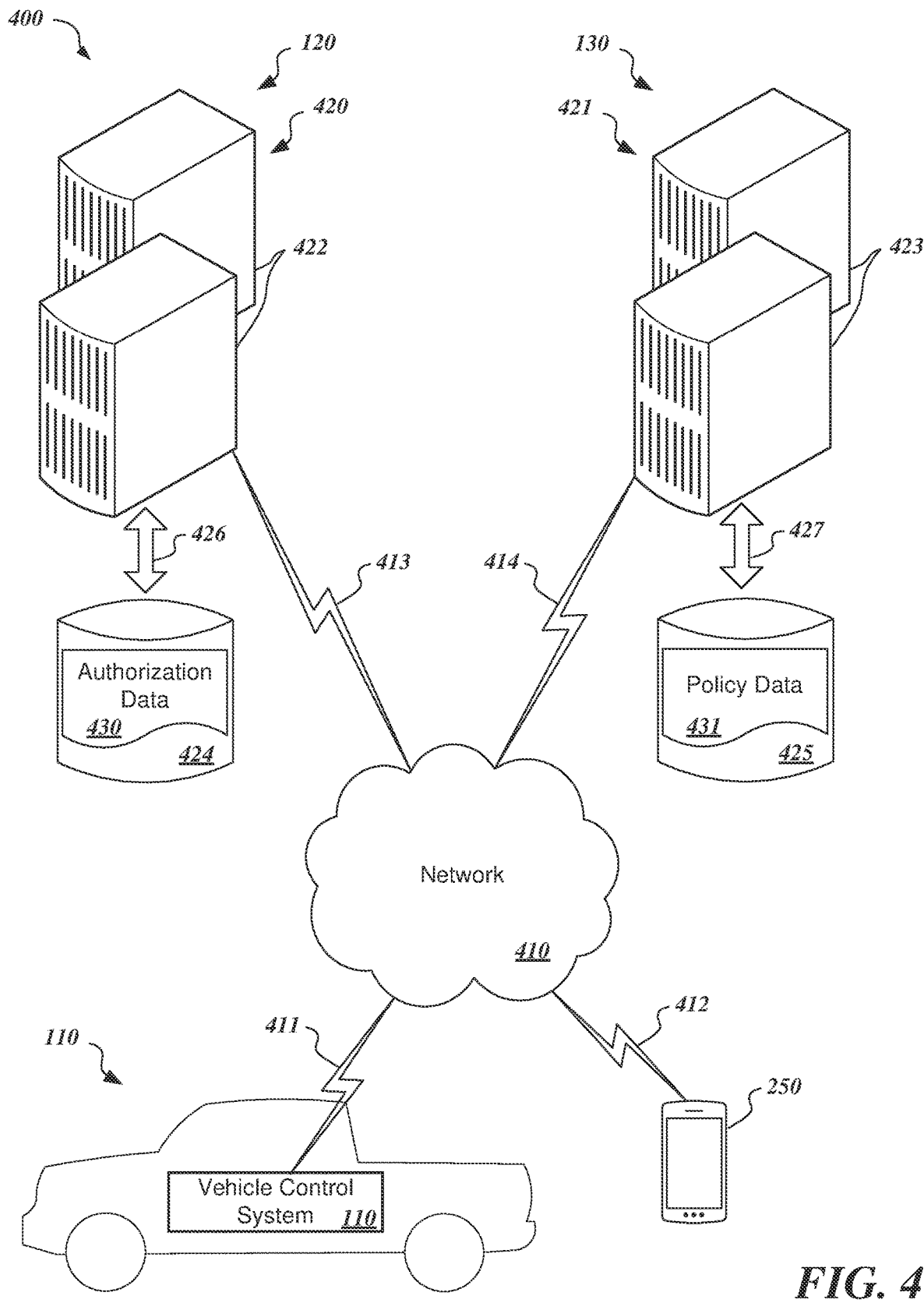
FIG. 4 is a block diagram of illustrative computing systems for exchanging data regarding authorized use and insurance coverage of an authorized user.

Referring additionally to FIG. 4, an operating environment 400 of the vehicle control system 110 may include one or more multiple remote computing systems 420 and 421. For example, a first remote computing system 420 may support the authorization control system 120 and a second remote computing system 421 may support an insurance carrier system 130. Although one computing system is shown for each, it will be appreciated that the authorization control system 120 may operate across multiple separate computing systems at one or more locations and each insurance carrier system 130 may operate multiple separate computing systems at one or more locations. Alternatively, if the operator of the authorization control system 120 provides insurance, the authorization control system 120 and the insurance carrier system 130 may be hosted on the same computing system.

In various embodiments, the remote computing systems 420 and 421 may be configured to communicate with the vehicle control system 110 of the vehicle 100 and/or a portable computing system 250 (FIG. 2) to control authorization of use of the vehicle 100 and/or to verify or secure insurance coverage to use the vehicle 100. The vehicle control system 110, the portable computing system 250, and the remote computing systems 420 and 421 may communicate over a network 410 via communications links 411, 412, 413, and 414, respectively. Because the vehicle 100 and the portable computing system 250 are movable devices, the communications links 411 and 412 generally may be wireless communications links, such as cellular, satellite, or Wi-Fi communications links. However, it will be appreciated that any or all of the systems may communicate over wireless or wired communications links. For example, when the vehicle 100 is connected to a power system to charge its battery system, a wired connection also may be made to permit wired communication between the vehicle control system 110 with the network 410. The remote computing systems 420 and 421 may include servers or server farms 422 and 423, respectively. The remote computing systems 420 and 421 may access programming and data from data storage devices 424 and 425, respectively, over high-speed channels 426 and 427, respectively.

For the authorization control system 120, data stored in the data storage devices 424 may include authorization data 430 identifying persons able to authorize use of the vehicle 100, authorized users 114 (not shown), and the conditions by which authorization has been permitted. For the insurance carrier system 130, data stored in the data storage devices 425 may include policy data 431, including data on existing policies that authorized users may invoke to support their use of the vehicle, or new policy data such as coverage and terms available for a policy that be secured to support use of the vehicle 100. In addition, the data storage devices 424 and 425 may include operating systems, applications, and other executable instructions used by the remote computing systems 420 and 421, respectively, as well as other data.

Figure 5:
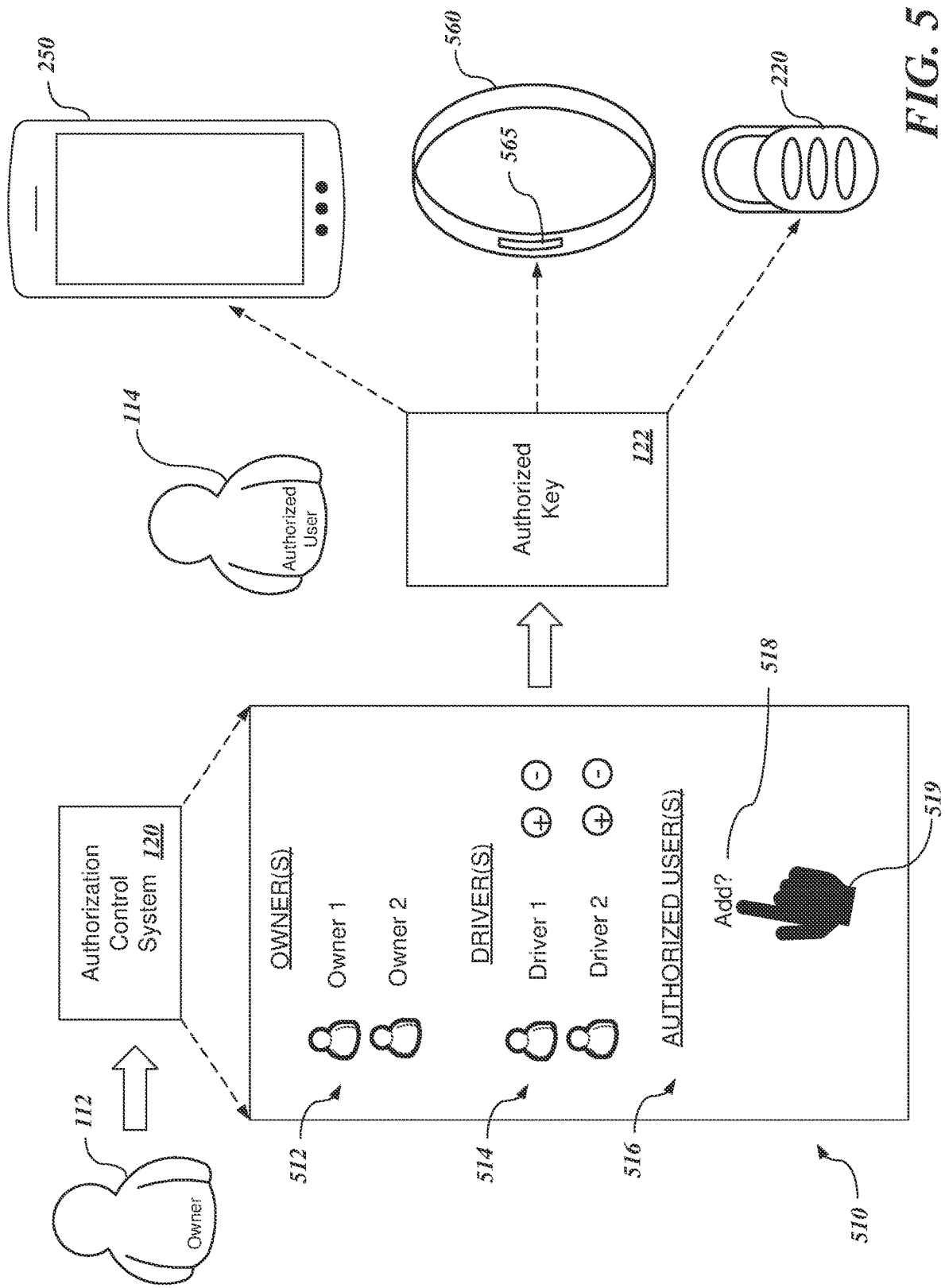
FIGS. 5 and 6 are screen diagrams of an authorization control system that enables an owner to activate an authorized key to permit use of a vehicle.

With the operational context and supporting environments thus described, operation of various embodiments is described to depict the function of apparatuses, systems, vehicles, and methods herein described. Referring additionally to FIG. 5, as previously described, the owner 112 of the vehicle 100 (not shown in this or the subsequent figures) may choose to permit the authorized user 114 to use the vehicle 100. By using an interface 510, which may be an interface of the vehicle control system 110 or another computing device, the owner 112 may authorize another user to use the vehicle. The interface 510 may allow the owner to verify the identity of himself or herself as one of the owners 512 to provide authorization to use the vehicle. The interface 510 may identify other drivers 514 authorized to use the vehicle and who may be covered by insurance associated with the vehicle. The interface 510 also may list authorized users 516 who have been authorized to use the vehicle, and provide an add option 518 to enable the creation of one or more additional authorized users. The interface 510 may include a touchscreen interface or other visual interface that the owner 112 may engage with a hand 519 and/or the interface 510 may be operated by voice commands.

Using the interface 510 to interact with the authorization control system 120, the owner 112 may activate or generate the authorized key 122 usable by the authorized user 114 to operate the vehicle. The authorized key 122 may be a key or fob 220. The authorized key 122 may be a wearable or portable object, such as a band 560, that includes a readable identification device 565, such as a transponder or a radio frequency identification (RFID) tag that may be read by the vehicle control system 110 (not shown in FIG. 5) to determine if the authorized user 114 presents a valid, authorized key. The authorized key 122 also may be presented as an electronic credential via the portable computing device 250 that is carried by the authorized user 114. Embodiments of the present disclosure are not restricted to an authorized key 122 of any particular type or form. It will also be appreciated that the embodiments of the present disclosure are not limited to any particular interface being used by the owner 112 and/or authorized user 114 to interact with the systems herein described.

Figure 6:
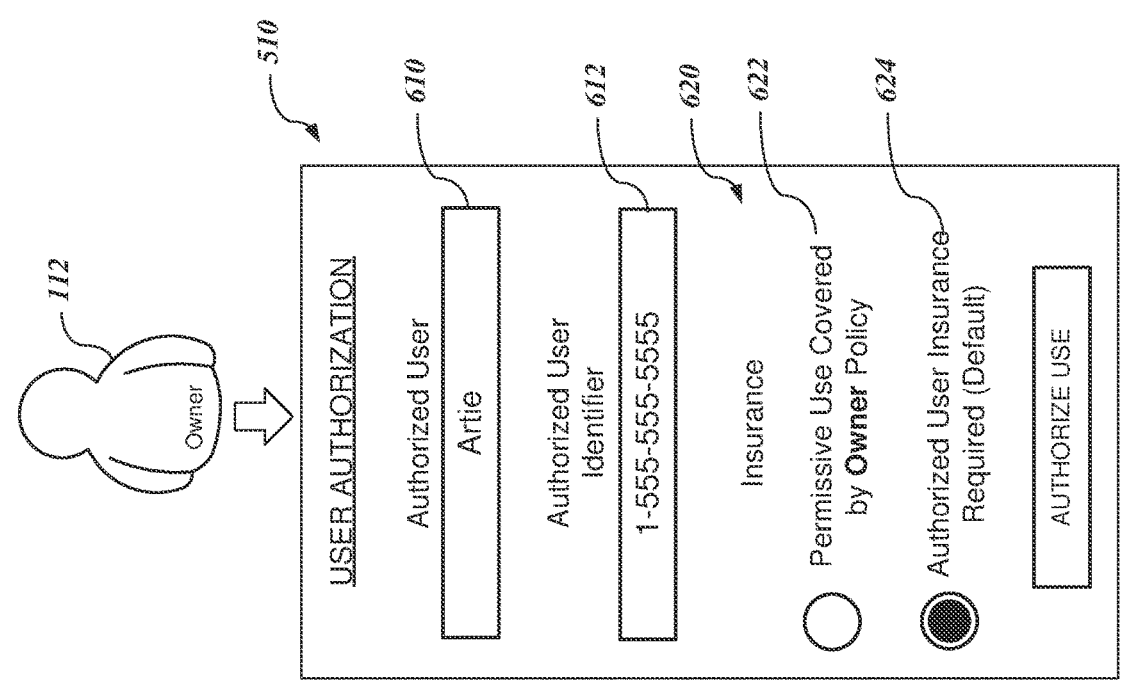

Referring additionally to FIG. 6, using the interface, the owner 112 may identify a new authorized user and specify terms of by which the authorized user 114 may operate the vehicle. By using the interface 510, the owner 112 may identify the authorized user by completing an identification field 610. The owner 112 may also provide a verifiable identifier for the authorized user 114, such as by entering information in an identification verification field 612. The identification verification field 612 may include a telephone number or email address associated with the authorized user 114 that the vehicle control system 110 (not shown in FIG. 6) may use to send a message by which the authorized user 114 can confirm his or her identity. The identification provided also may include a password or other sequence that the authorized user 114 may be required to present to the vehicle control system 110 to be able to initiate possible use of the vehicle.

In various embodiments, the owner 512 also may be able to specify insurance terms 620 for the authorized use. The owner 112 may choose to permit the authorized user 114 to use the vehicle as a permissive use that will be covered by the owner's own policy (subject to whatever coverage may be automatically applied by the policy of the authorized user 114). On the other hand, the owner 112 may choose to permit the use only if the authorized user 114 provides insurance coverage to cover his or her use of the vehicle. In the example of FIG. 6, the owner 112 specifies that the authorized user 114 will provide insurance to cover use of the vehicle. Subject to these terms, the authorized user 112 chooses to grant use of the vehicle to the authorized user 114. The authorized key 122 (FIGS. 1 and 5) is then operable for the authorized user 114 to use, provided the authorized user 114 fulfills the insurance requirement specified in the example of FIG. 6.

Figure 7:
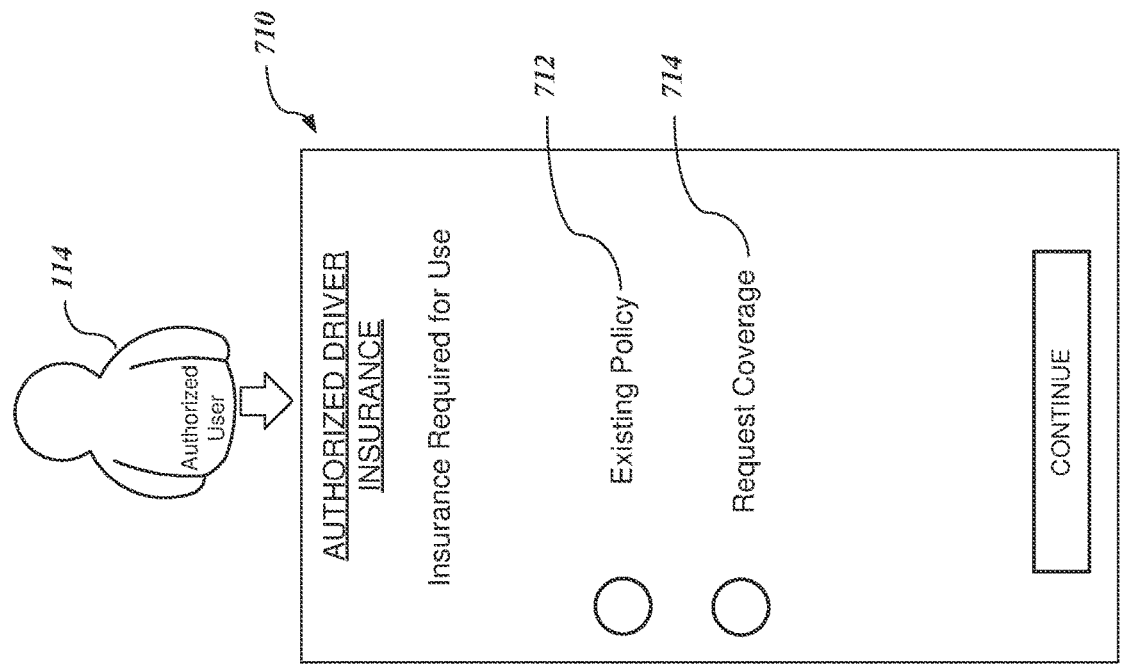

Referring additionally to FIG. 7, in various embodiments, because the authorized user 114 is required by the owner to provide authorized driver insurance through interface 710 for the use of the vehicle 100, the authorized user 114 may choose to satisfy the requirement by identifying an existing policy 712 or by specifying that the authorized user is requesting coverage 714.

Figure 8:
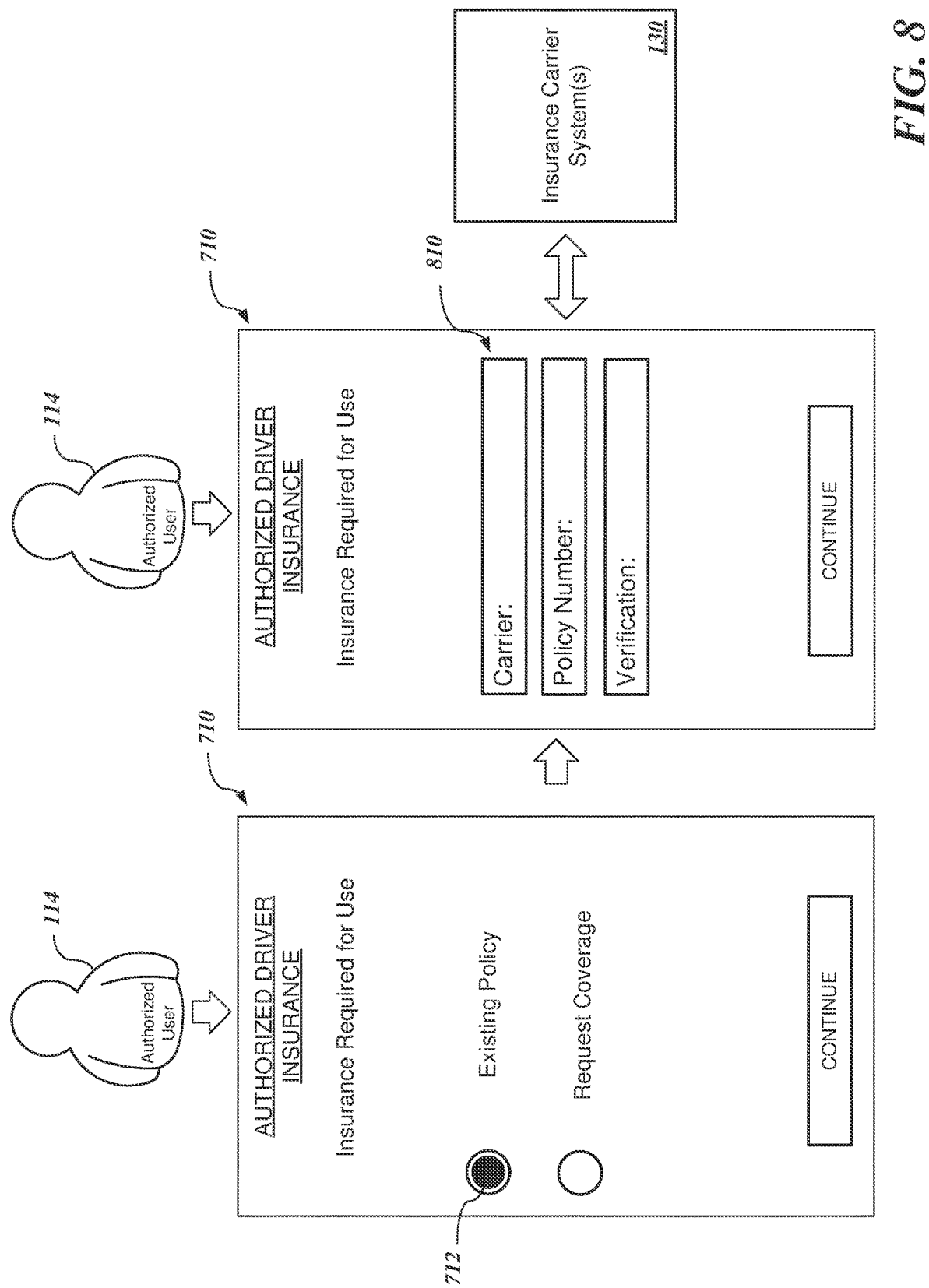

Referring additionally to FIG. 8, the authorized user 114 elects to satisfy the insurance requirement by providing proof of insurance coverage that will cover the use of the vehicle. Upon selecting the existing policy 712 option, in various embodiments, the authorized user 114 is prompted for policy information 810 about the existing policy. By providing policy information 810, such as the carrier, policy number, and information used for verifying the identity of the authorized user 114, and other information, the authorization control system 120 (not shown in FIG. 8) can query the insurance carrier system 130 of the specified carrier to verify whether the policy exists and if it will cover the authorized use. If the authorized user 114 is covered by a qualifying policy, the authorization control system 120 may enable the vehicle control system 110 to recognize the authorized key 122 (neither of which is shown in FIG. 8) to permit the authorized user 114 to operate the vehicle. Alternatively, it is possible that the insurance carrier system 130 may report to the authorization control system 120 that the identified policy does not cover the authorized user 114 for the use communicated by the authorization control system 120. In this case, use of the vehicle by the authorized user 114 will not be permitted by the authorization control system 120.

Referring additionally to FIG. 9, it is possible that the insurance carrier system 130 may inform the authorized user 114 that a rider or other supplemental coverage must be added to the specified policy to cover the intended use of the vehicle by the authorized user 114. In such a case, the authorized user 114 may be prompted to select a supplemental insurance option 912 whereby the authorized user 114 is willing to secure the supplemental coverage. In such case, the authorized user 114 will be able to arrange the supplemental coverage in a manner as described below in which the authorized user 114 seeks to arrange a separate policy to cover the authorized user 114 in using the vehicle.

Referring additionally to FIG. 10, when the authorized 114 user does not have a policy that will cover the authorized use and/or does not wish to apply an existing policy, the authorized user 114 may choose the request coverage option 714 to arrange to secure an on-demand policy. In either of the examples referenced with regard to FIGS. 9 and 10, via the interface 710, the authorization control system 120 will enable the user to engage with the authorized user's insurance carrier system 130 or potentially secure offers from multiple insurance carrier systems 130 to arrange an on-demand insurance policy to cover the use of the vehicle.

Referring additionally to FIG. 11, in various embodiments, as part of determining the terms of a supplemental or on-demand policy, the authorized user 114 also may be prompted to provide user driving information 1110, including accident data, infraction data, incident data, driving safety or risk avoidance scores, and identified driving behavior style, or the user driving information 1110 may be provided by a third-party source when the authorized user 114 provides consent to access the user driving information 1110. Driving safety or risk avoidance scores may be assigned by a third party based on driving history, including past incidents, moving violations, or previously asserted insurance claims. Risk avoidance scores also may be assigned based on driving information captured about the authorized user 114 and his or her driving by vehicle sensors and collected by an insurance carrier or another entity. Based on the information provided, the authorized user 114 may be presented with terms 1112 for at least one available policy and/or with the terms for multiple alternative policies. The terms may include the coverage limits, coverage types, deductible amount(s), cost, and other details. The policy may be time-based, for example, to cover use of the vehicle for a duration of hours, days, etc., or the policy may be usage-based, for example, to cover usage per unit time or unit of distance traveled per unit cost.

Referring additionally to FIG. 12, once the authorized user 114 elects to purchase the policy (or a particular policy, if more than one is available), the authorized user 114 may secure the policy by providing payment information 1210, such as payment type, account number, and payment verification information. As previously described, the information may be routed from the interface 710 via the authorization control system 120 to the insurance carrier system(s) 130 to complete the acquisition of the policy. Once the policy is secured, the vehicle authorization system 120 may enable the vehicle control system 110 to recognize the authorized key 122 (neither of which is shown in FIG. 8) to permit the authorized user 114 to operate the vehicle.

Figure 13:
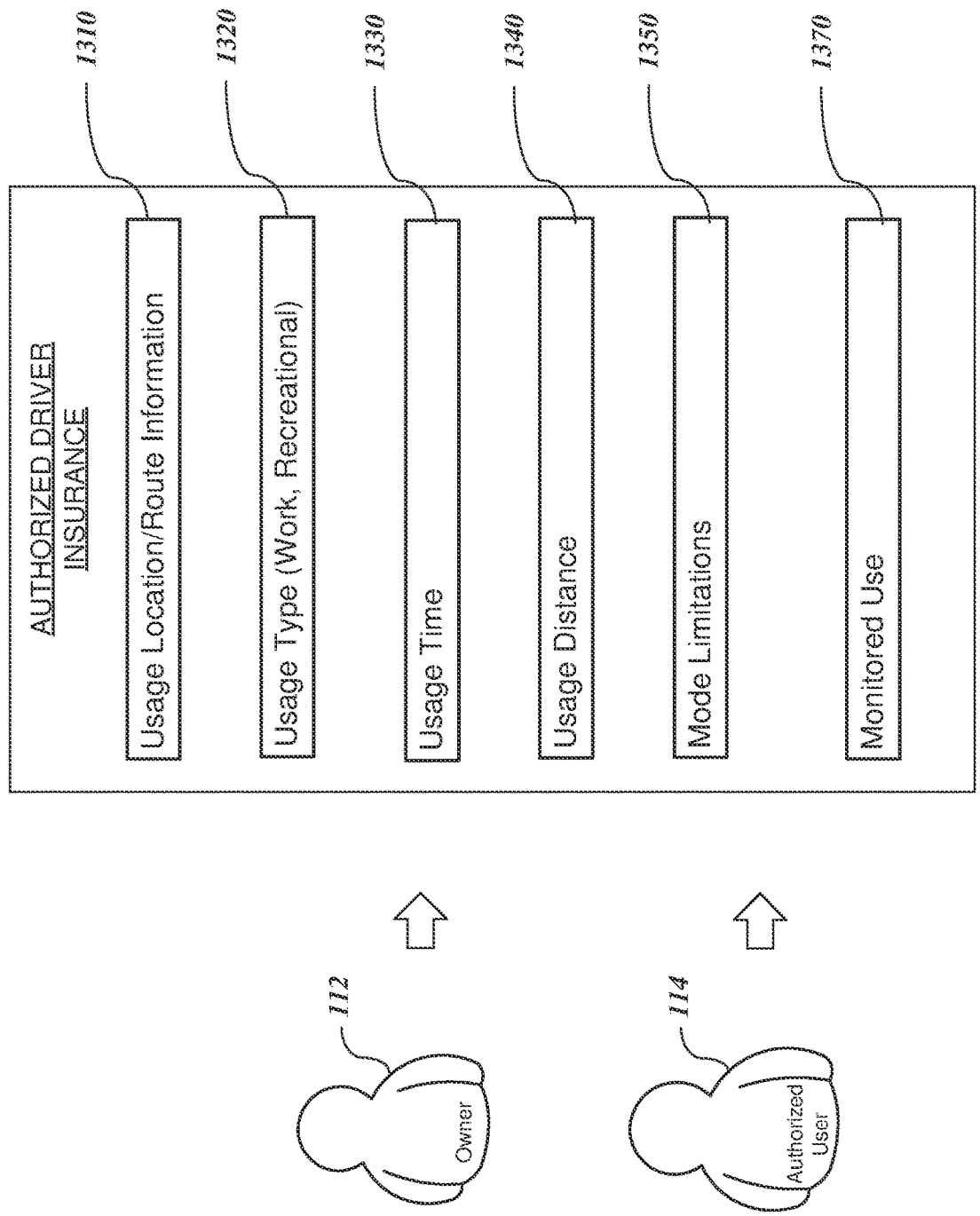
FIG. 13 is a screen diagram of an authorization control system that enables users to specify terms of use of a vehicle.

In various embodiments, in addition to the types of details and terms previously discussed, as part of allowing the authorized use or securing a supplemental or on-demand insurance policy, the owner 112 and/or the authorized user 114 may specify or provide other details. Referring additionally to FIG. 13, in various embodiments the owner 112 may specify additional limitations on the authorized user. The limitations may include specifying particular usage location/route information 1310. The usage location may include specifying whether the vehicle is to be used in a city, suburb, off-road, etc. The route information may specify whether the vehicle will be driven on highways, freeways, surface streets, etc. The limitations also may specify a type of driving 1320 (e.g., work, recreational), a usage time permitted 1330, a usage distance permitted 1340, or other limitations or conditions. In securing supplemental or on-demand insurance coverage, the authorized user 114 may similarly identify the usage location 1310, the type of driving 1320, the usage time 1330 and/or usage distance 1340. Similarly, mode limitations 1350 may be specified to prevent the authorized user 114 from activating or using some modes or features of the vehicle 100. For example, mode limitations 1350 may include preventing the authorized user 114 from activating off-road driving features, from deactivating automated driver assistance systems, such as automatic emergency braking or lane-keeping assistance features. In addition, where the vehicle 100 is a type of vehicle with which the authorized user 114 may or may not have familiarity that could affect the terms of the coverage, a vehicle familiarity 1360 may be specified. For example, if the vehicle 100 includes an electrically-powered vehicle that, it may have operating characteristics that may present a challenge to a user not familiar with these characteristics, such as rapid deceleration resulting from regenerative braking. Similarly, the vehicle familiarity 1360 may be applicable if the vehicle 100 is a truck and authorized user 114 is used to driving passenger vehicles.

In various embodiments, usage of the vehicle may be restricted to monitored use 1370 so that the owner 112 may be assured that the authorized user 114 does not use the vehicle in a way not contemplated by the owner 112 in permitting the authorized user 114 to use the vehicle. The monitored use 1370 of the vehicle also may be for the sake of the insurance carrier to ensure that the authorized user 114 uses the vehicle in accordance with the terms on which a supplemental or on-demand policy was issued. Thus, for example, if the owner 112 agrees to allow the authorized user 114 to use the vehicle for commuting, the authorized user 114 may be restricted from using the vehicle for off-road driving or for traveling more than a stated distance. Similarly, if a supplemental or on-demand insurance policy was issued for use in a particular location, such as suburban use, the policy terms could be voided or modified if the user operated the vehicle in an urban area. For example, if the authorized user 114 uses the vehicle in a manner inconsistent with the policy issued, the insurance carrier could increase the cost of the policy.

Further, the driving behavior of the authorized user 114 may be monitored to report to the owner 112 and/or to the insurance carrier for providing decision support to the owner 112 as whether to allow future use of the vehicle by the authorized user 114 and/or to inform future insurance coverage determinations. For example, if monitoring operation of the vehicle by the authorized user 114 indicates that the authorized user 114 includes high risk behaviors, such as driving at excessive speeds, hard braking, or other behaviors, these monitored behaviors may be reported to the owner 112 and/or evaluated by an insurance carrier that provides supplemental or on-demand insurance. As a result, the owner 112 can consider this behavior in determining whether to allow the authorized user 114 to subsequently be an authorized user. Correspondingly, an insurance carrier that issues supplemental or on-demand insurance coverage to the authorized user 114 may use the monitored driving behavior to determine a rate for the current or a future policy or policies for the authorized user 114 based on the monitored driving behavior. Thus, for example, if the authorized user 114 is charged one rate for a particular authorized use, but the monitored driving behavior includes high-risk behaviors, the insurance carrier may decline to offer subsequent supplemental or on-demand coverage to the authorized user or may adjust the rate charged for the coverage. On the other hand, if the monitored use 1370 shows that the authorized user 114 employs careful or low-risk driving behaviors, then the insurance carrier may offer supplemental or on-demand insurance at a reduced charge. Thus, a cost of a supplemental or usage-based policy is adjustable for current and/or subsequent usage based on driving behaviors of the authorized user 114 detected during at least one preceding instance of operation of the vehicle by the authorized user 114.

Figure 14:
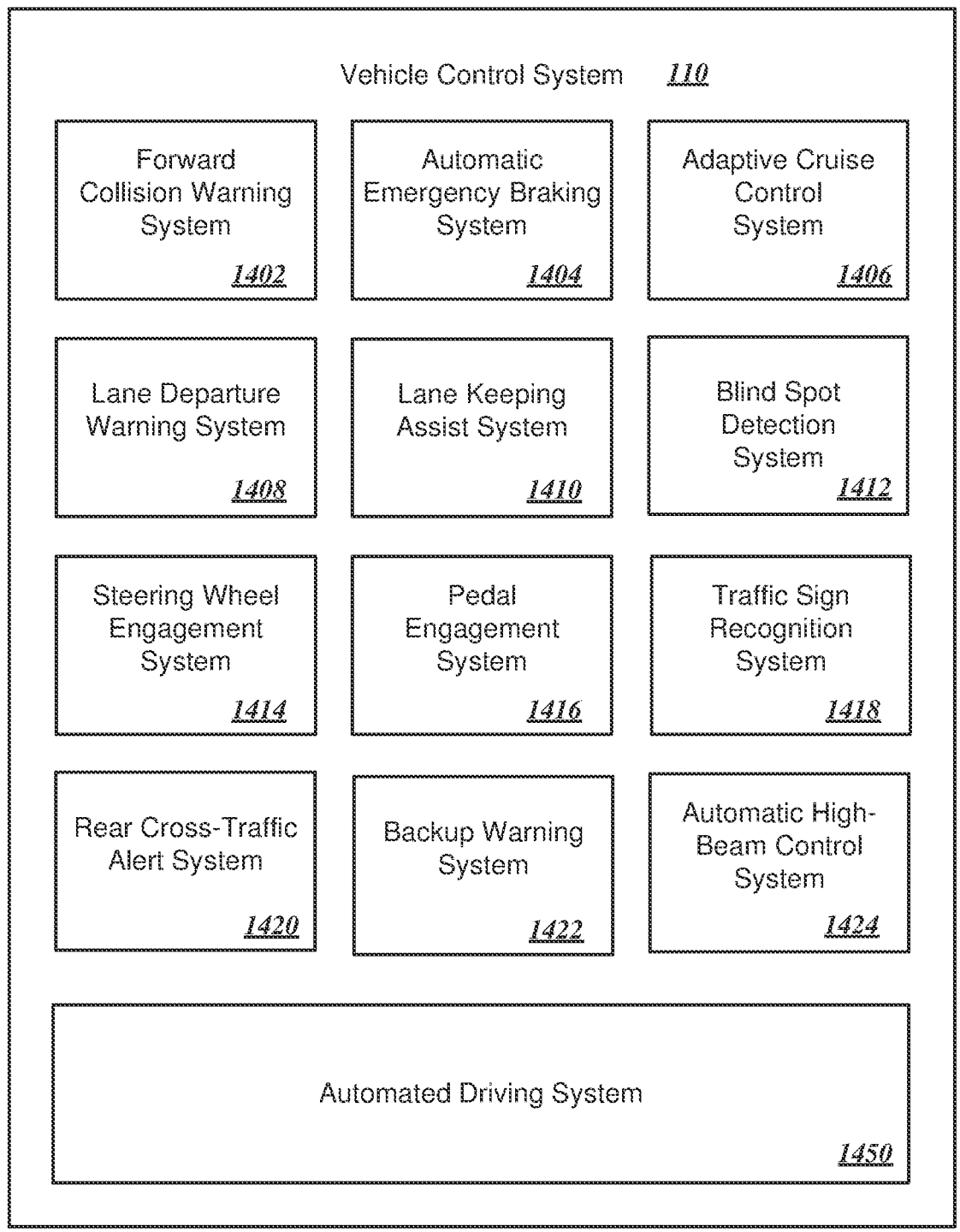
FIG. 14 is a block diagram of aspects of the vehicle control system of FIG. 1.

Referring additionally to FIG. 14, in various embodiments the vehicle may include many sensing systems usable to monitor how and where the vehicle is operated. The vehicle control system 110 includes a number of subsystems that may provide data. For example, in various embodiments, the vehicle control system 110 may include a forward collision warning system 1402 to alert an operator, such as the authorized user 114, proceeding at a normal travel speed, of a stopped vehicle or other object in the road. The engagement of the forward collision warning system 1402, or repeated use of the engagement of the forward collision warning system 1402, may be indicative of operator inattention by the authorized user 114. Similarly, the vehicle control system 110 may include an automatic emergency braking system 1404. While the forward collision warning system 1402 alerts the operator to apply the brakes to avoid a stoppage or other object in the road, the automatic emergency braking system 1404 actually automatically engages the brakes to stop the vehicle 100 (FIG. 1) of its own accord when a stoppage or other object is detected in the road. The engagement of the emergency braking system 1404 also may be indicative of operator inattention by the authorized user 114.

The vehicle control system 110 also may include an adaptive cruise control system 1406. The adaptive cruise control system 1406 automatically adjusts a cruising speed, set by the operator or the cruise control system, to reflect the speed of traffic ahead. For example, if an operator sets the adaptive cruise control system 1406 to a posted highway speed of 65 miles per hour but, because of traffic, the speed of vehicles in the road ahead travel varies between 55 and 65 miles per hour, the adaptive cruise control system 1406 will repeatedly adjust the cruising speed to maintain a desired distance between the vehicle and other vehicles in the road ahead. Whether the authorized user 114 uses the adaptive cruise control system 1406 may be considered in evaluating the authorized user 114 for future use of the vehicle or the insurance terms available to the authorized user 114.

The vehicle control system 110 may include a lane departure warning system 1408 that alerts an operator when the vehicle veers close to or across a lane marker and thereby presents an obvious hazard. The vehicle control system 110 may include a lane keeping assist system 1410 that steers the vehicle to prevent the vehicle from veering close to or across a lane marker. The extent to which the authorized user 114 uses the system—or must rely on the system—may be used in evaluating the level of care employed by the authorized user 114.

The vehicle control system 110 may include a blind spot detection system 1412 that alerts an operator of vehicles traveling in blind spots off the rear quarters of the vehicle to warn the operator not to change lanes in such cases. The vehicle control system 110 may include a steering wheel engagement system 1414 that detects when the operator has released the wheel. Release of the wheel may be logged as an indication of operator inattention. The vehicle control system 110 may include a pedal engagement system 1416 that detects when the operator's foot is in contact with the accelerator pedal or the brake pedal. The timing of the operator in engaging one of the pedals also may be logged as an indication of overly-aggressive driving, such as if the operator continually accelerates and decelerates sharply. The vehicle control system 110 also may include a traffic sign recognition system 1418 that, for example, recognizes stop signs or speed limit signs. Again, all of these systems may provide data indicative of the level of care employed by the authorized user 114.

The vehicle control system 110 also may include a rear cross-traffic alert system 1420 to apprise an operator of the approach of other vehicles when the vehicle is moving out of a space. Similarly, the vehicle control system 110 may include a backup warning system 1422 that warns the operator when the vehicle is approaching an object behind the vehicle. The vehicle control system 110 may include an automatic high-beam control system 1424 to de-activate and re-activate high beams as other cars approach and then pass by. Availability of such a system may reduce the likelihood of incidents during travel on highways or surface streets with insufficient or no lighting. The vehicle control system 110 also may include an automated driving system 1450 that provides for partially-autonomous or fully autonomous control of the vehicle. Permitting the authorized user 114 to use the vehicle 100 only subject to partially-autonomous or fully-autonomous control could affect the coverage available or the cost of that coverage based on the reduced risk afforded by using such systems. The willingness of the authorized user 114 to activate these features may also provide an indication of the level of care used by the authorized user 114 in operating the vehicle.

Figure 15:
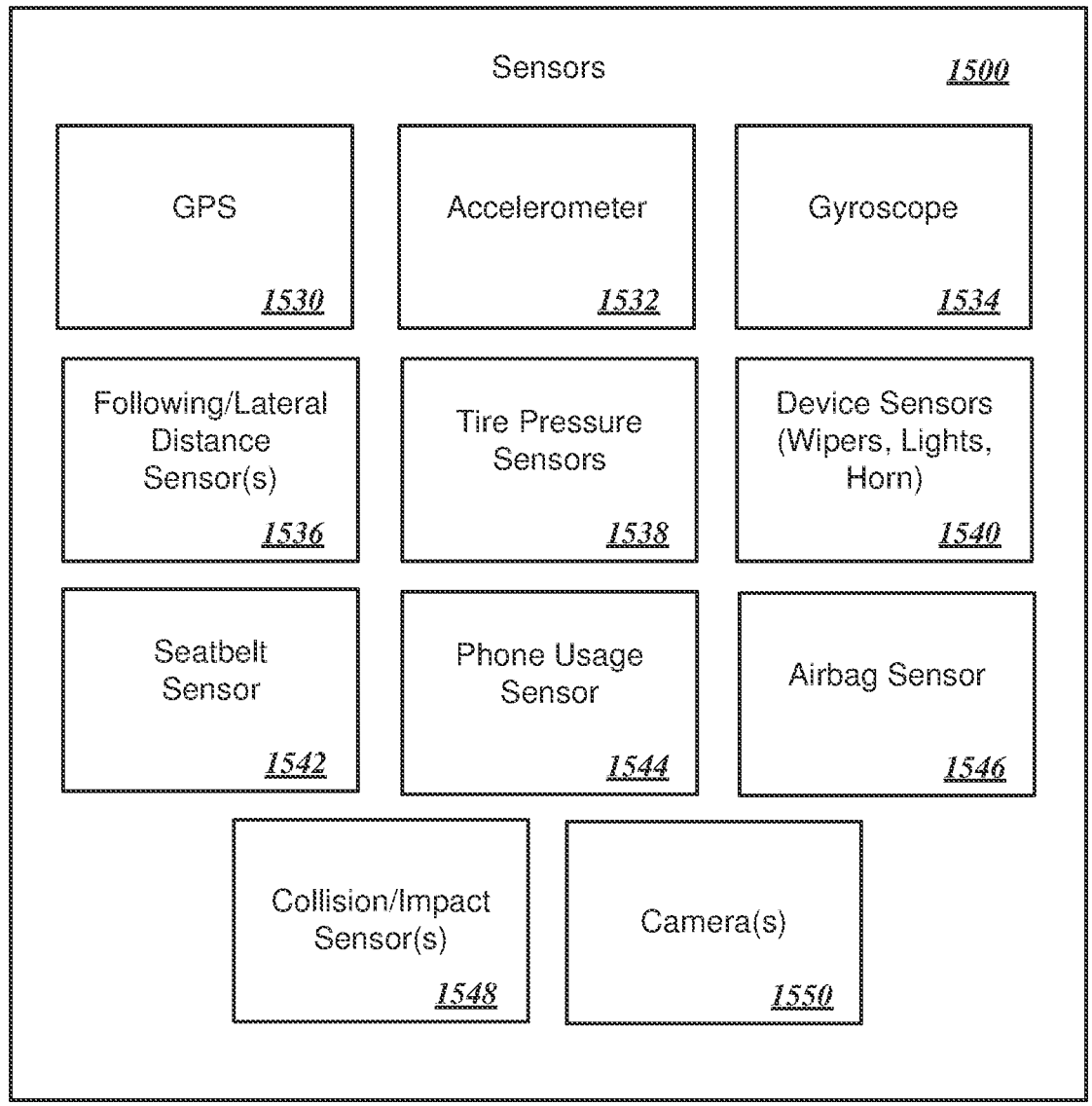
FIG. 15 is a block diagram of sensor systems useable by the system of FIG. 14.

Referring additionally to FIG. 15, in addition to the devices included in the vehicle control system 110, the vehicle data system 111 may receive inputs from other sensors. The sensors 1500 may include a GPS device 1530 to monitor position and movement of the vehicle to, for example, determine where the vehicle is being used and/or if the use is consistent with the agreed use and the supplemental or on-demand insurance policy in place. The sensors 1500 also may include an accelerometer 1532 to detect rapid acceleration or deceleration that potentially may indicate overly-aggressive driving or hard braking as a result of operator inattention or dangerous traffic patterns. The sensors 1500 may include a gyroscope 1534 to detect abrupt changes of direction indicative of a treacherous road, sharp lane changes, or abrupt turns. The sensors 1500 may include at least one following distance/lateral distance sensor 1536 to determine how closely the vehicle follows other vehicles or how closely the vehicle passes next to other vehicles. The following distance/lateral distance sensor 1536 may use any technology that can determine following distance from another vehicle, such as radar, LIDAR, optical measurement made using cameras or other optical sensors, ultrasonic measurement, laser measurement, or any other technology that can be used to determine following distance from another vehicle.

The sensors 1500 may also include device sensors, such as tire pressure sensors 1538 to monitor whether the tires are inflated to a recommended level. The sensors 1500 also may include miscellaneous device sensors 1540 to determine whether other systems, such as the lights, horn, and wipers have been used on particular routes. The sensors 1500 may also include a seatbelt sensor 1542 to indicate whether the occupants wore seatbelts on particular routes. The sensors 1500 may also include a phone usage sensor 1544 (which may take the form of an app executing on the phone) to report whether the operator was handling or operating the operator's phone on particular routes. The sensors 1500 may include an airbag deployment sensor 1546 or a collision sensor 1548 to report a catastrophic event that resulted in a collision and/or a serious collision that warranted deployment of the airbag. Finally, the sensors 1500 may include one or more cameras 1550 to detect and evaluate conditions in and around the vehicle 100. The cameras 1550 outside of the vehicle may be able to monitor position of the vehicle relative to other vehicles and position of the vehicle on the road, to monitor travel conditions such as traffic, weather, and roadway conditions, and to collect other data. The cameras 1550 inside of the vehicle may be used to identify the operator, determine whether occupants are wearing seatbelts, whether an operator is distracted, and gather other information.

The data collected from the sensors 1500 may be received by the vehicle control system 110 and used to evaluate the care used by the authorized user 114 for the sake of the owner 112 and/or for an insurance carrier who may have provided or may be providing the supplemental or on-demand insurance coverage. Table 1 presents a list of data that may be included in the vehicle driving data 101. Table 1 includes a data field that may be logged and, for those quantities that are regularly sampled and/or stored, a frequency with which the data is sampled and/or stored.

TABLE 1

| Field | Description | Minimum Sampling/ Storing Frequency |
|---|---|---|
| Vehicle ID | Unique identifier for each vehicle that can be tied back to the VIN | NA |
| VIN | Vehicle Identification Number | NA |
| Driver ID | Unique identifier for each driver when available | NA |
| Trip ID | Unique identifier for a specific trip | NA |
| Trip Start | Start date and time of trip | NA |
| Trip End | End date and time of trip | NA |
| Time Stamp | Timestamp taken from every variable reporting at one-second granularity | 1 Hz |
| Time Zone Offset | | 1 Hz |
| Odometer | | NA |
| Vehicle Speed | Calculated using multiple sensors including speed of each motor | 1 Hz |
| Accelerometer | Measuring 3-axis movement throughout the vehicle | 10 Hz |
| Hard Braking | | 1 Hz |
| Rapid Acceleration | | 1 Hz |
| Aggressive cornering | | 1 Hz |
| Autonomous Mode On/Off | Enabled and Disabled | 1 Hz |
| Autonomous Mode Indicators | Warnings, driver actions, feature status, feature sub-state, etc. | 1 Hz |
| Adaptive Cruise Control On/Off | Enabled and Disabled | 1 Hz |
| Adaptive Cruise Control Status | Warnings, driver actions, feature status (set, cancel, resume, etc.), feature sub-state, distance/gap settings, speed settings, etc. | 1 Hz |

TABLE 1-continued

| Field | Description | Minimum Sampling/Storing Frequency |
|---|---|---|
| Lane Keeping Assist On/Off | Enabled and Disabled | 1 Hz |
| Lane Keeping Assist | Warnings (LH, RH), driver actions, feature status, feature sub-state, etc. | 1 Hz |
| Lane Departure Warning On/Off | Enabled and Disabled | 1 Hz |
| Lane Departure Warning | Warnings (LH, RH), driver actions, feature status, feature sub-state, etc. | 1 Hz |
| Manual Park Assist On/Off | Enabled and Disabled | 1 Hz |
| Manual Park Assist | Warnings, driver actions, feature status, feature sub-state, etc. | 1 Hz |
| Auto Emergency Braking Engaged On/Off | Enabled and Disabled | 1 Hz |
| Auto Emergency Braking Engaged | Warnings, Proximity, driver actions, vehicle actions, feature status, feature sub-state, etc. | 1 Hz |
| Hands off the wheel | Warnings, driver actions, feature status, feature sub-state, etc. | 1 Hz |
| Forward Collision Warning On/Off | Enabled and Disabled | 1 Hz |
| Forward Collision Warning | Warnings, Proximity, driver actions, vehicle actions, feature status, feature sub-state, etc. | 1 Hz |
| Rear Cross Traffic Alert On/Off | Enabled and Disabled | 1 Hz |
| Rear Cross Traffic Alert | Warnings, Proximity, driver actions, vehicle actions, feature status, feature sub-state, etc. | 1 Hz |
| Blindspot Monitoring On/Off | Enabled and Disabled | 1 Hz |
| Blindspot Monitoring | Warnings, Proximity, driver actions, vehicle actions, feature status, feature sub-state, etc. | 1 Hz |
| Backup Warning System On/Off | Enabled and Disabled | 1 Hz |
| Backup Warning System | Warnings, Proximity, driver actions, vehicle actions, feature status, feature sub-state, etc. | 1 Hz |
| GPS (Latitude, Longitude, and Accuracy) | Altitude, bearing, error, mode, position (latitude/longitude), speed | 1 Hz |
| Vehicle Nighttime Parking | | NA |
| Vehicle Daytime Parking | | NA |
| Distraction/Inattention On/Off | Enabled and Disabled Status for each monitoring device, driver monitoring system and any additional sensors being used | 1 Hz |
| Distraction/Inattention | Eyes on road, head and/or eye positions, pupil dilation, warnings, driver actions, feature status, feature substate, etc. | 1 Hz |
| Proximity Sensors | Object distance from the vehicle - vehicles, pedestrians, etc. - multiple sensors including radar, LiDAR, video, ultrasonic, etc. | 1 Hz |
| Impact Sensor Event | | 1 Hz |
| Crash Detection | Incident detection, location of impact, severity of impact, sensors damaged, etc. | 1 Hz |
| Airbag Deployment | | 1 Hz |
| Vehicle Roll-over | | 1 Hz |
| Vehicle Spin-out | | 1 Hz |
| Driver Seatbelt Event | Seat occupied, seatbelt status | 1 Hz |
| Passenger Seatbelt Event | Seat occupied, seatbelt status | 1 Hz |
| Driver Detection | Driver ID detection, age, gender, key type, user role, known insured, vehicle settings and connections, etc. | 1 Hz |
| Headlights On/Off | On/Off, high or low beam, status, fault, warnings, animations, etc. | 1 Hz |
| Fog-lights On/Off | On/Off, high or low beam, status, fault, warnings, animations, etc. | 1 Hz |
| Windshield Wipers Manual On/Off | Status | 1 Hz |
| Rain sensor | Enabled, disabled, status, failure warnings | 1 Hz |
| Warning Lights On/Off | Status | 1 Hz |
| Smartphone Paired | Enabled, name, usage, warnings, features status, subfeature status, etc. | 1 Hz |
| Phone Calls | Connection, connection type, duration, volume, etc. | 1 Hz |
| Alexa Usage | Connection, connection type, duration, volume, etc. | 1 Hz |
| Music Volume | Connection, connection type, duration, volume, etc. | 1 Hz |
| Traffic Sign Recognition | Enabled or disabled, feature status, failures, type, translation, etc. | 1 Hz |
| Traffic Light Info | Enabled or disabled, feature status, failures, type, translation, etc. | 1 Hz |
| High Beam Assist | Feature Status | 1 Hz |
| Tire Pressure | Status, position, pressure, warnings, actions | 1 Hz |
| Outside Temperature | | 1 Hz |
| Vehicle Interior Temperature | | 1 Hz |
| Door Locks | Locked, unlocked, door ajar, failures, door location, signals, warnings, feature status, etc. | 1 Hz |
| Video recording during trip | Enabled or disabled, frame rate, storage location, storage type, storage space, retrieval, recording ID, recording flags, etc. | 1 Hz |
| Video recording when parked | Enabled or disabled, frame rate, storage location, storage type, storage space, retrieval, recording ID, recording flags, etc. | 1 Hz |

Figure 16:
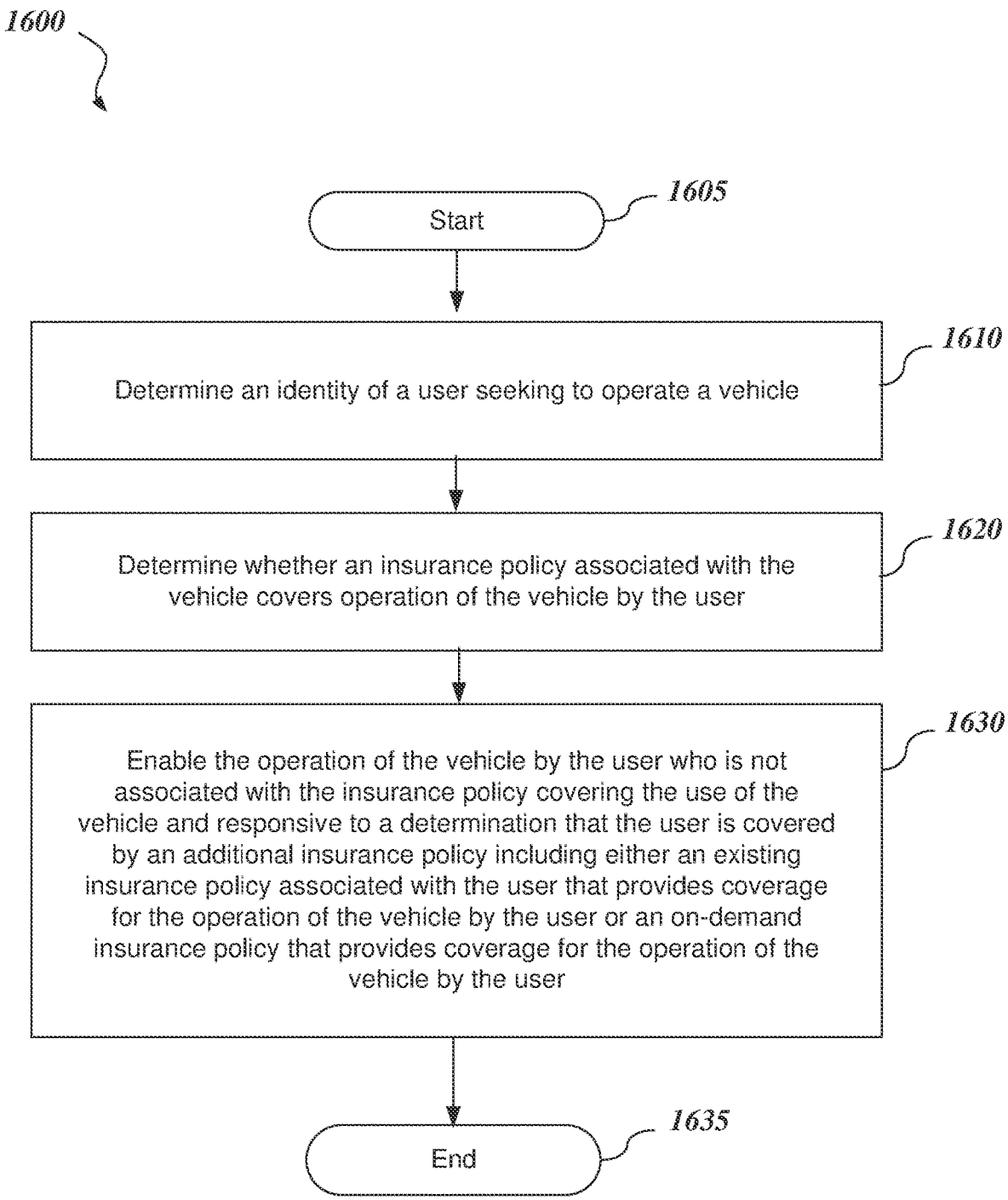
FIG. 16 is a flow chart of an illustrative method for determining that when an owner of a vehicle authorizes a user to use the vehicle, that the authorized user is covered by an insurance policy to cover the use.

Referring additionally to FIG. 16, in various embodiments an illustrative method 1600 can determine whether a user's use of a vehicle is covered by an insurance policy associated with the user. The method 1600 begins at a block 1605. At a block 1610, an identity is determined of a user seeking to operate a vehicle. At a block 1620, it is determined whether an insurance policy associated with the vehicle covers operation of the vehicle by the user. At a block 1630, operation of the vehicle by the user who is not associated with the insurance policy covering the use of the vehicle is enabled in response to a determination that the user is covered by an additional insurance policy including either an existing insurance policy associated with the user that provides coverage for the operation of the vehicle by the user or an on-demand insurance policy that provides coverage for the operation of the vehicle by the user. The method 1600 ends at a block 1635.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

The term module, as used in the foregoing/following disclosure, may refer to a collection of one or more components that are arranged in a particular manner, or a collection of one or more general-purpose components that may be configured to operate in a particular manner at one or more particular points in time, and/or also configured to operate in one or more further manners at one or more further times. For example, the same hardware, or same portions of hardware, may be configured/reconfigured in sequential/parallel time(s) as a first type of module (e.g., at a first time), as a second type of module (e.g., at a second time, which may in some instances coincide with, overlap, or follow a first time), and/or as a third type of module (e.g., at a third time which may, in some instances, coincide with, overlap, or follow a first time and/or a second time), etc. Reconfigurable and/or controllable components (e.g., general purpose processors, digital signal processors, field programmable gate arrays, etc.) are capable of being configured as a first module that has a first purpose, then a second module that has a second purpose and then, a third module that has a third purpose, and so on. The transition of a reconfigurable and/or controllable component may occur in as little as a few nanoseconds, or may occur over a period of minutes, hours, or days.

In some such examples, at the time the component is configured to carry out the second purpose, the component may no longer be capable of carrying out that first purpose until it is reconfigured. A component may switch between configurations as different modules in as little as a few nanoseconds. A component may reconfigure on-the-fly, e.g., the reconfiguration of a component from a first module into a second module may occur just as the second module is needed. A component may reconfigure in stages, e.g., portions of a first module that are no longer needed may reconfigure into the second module even before the first module has finished its operation. Such reconfigurations may occur automatically, or may occur through prompting by an external source, whether that source is another component, an instruction, a signal, a condition, an external stimulus, or similar.

For example, a central processing unit of a personal computer may, at various times, operate as a module for displaying graphics on a screen, a module for writing data to a storage medium, a module for receiving user input, and a module for multiplying two large prime numbers, by configuring its logical gates in accordance with its instructions. Such reconfiguration may be invisible to the naked eye, and in some embodiments may include activation, deactivation, and/or re-routing of various portions of the component, e.g., switches, logic gates, inputs, and/or outputs. Thus, in the examples found in the foregoing/following disclosure, if an example includes or recites multiple modules, the example includes the possibility that the same hardware may implement more than one of the recited modules, either contemporaneously or at discrete times or timings. The implementation of multiple modules, whether using more components, fewer components, or the same number of components as the number of modules, is merely an implementation choice and does not generally affect the operation of the modules themselves. Accordingly, it should be understood that any recitation of multiple discrete modules in this disclosure includes implementations of those modules as any number of underlying components, including, but not limited to, a single component that reconfigures itself over time to carry out the functions of multiple modules, and/or multiple components that similarly reconfigure, and/or special purpose reconfigurable components.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software (e.g., a high-level computer program serving as a hardware specification), firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software (e.g., a high-level computer program serving as a hardware specification) and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While the disclosed subject matter has been described in terms of illustrative embodiments, it will be understood by those skilled in the art that various modifications can be made thereto without departing from the scope of the claimed subject matter as set forth in the claims.

What is claimed is:

1. A system comprising:
   one or more computing devices associated with a vehicle and having non-transitory computer-readable media storing computer-executable instructions configured to cause the one or more computing devices to:
   at an authorization control system, receive a request from a user to allow an authorized user to operate the vehicle and, responsive to the request:
     verify insurance coverage of the authorized user and,
     responsive to the insurance coverage being verified, enable a device of the authorized user as an authorized key device by transmitting an electronic credential from the authorization control system to the device of the authorized user; and
   at a vehicle control system:
     receive, responsive to the authorized key device being brought into a predetermined proximity the vehicle, the electronic credential from the authorized key device,
     verify the enabling of the authorized key device based on the electronic credential, and,
     responsive to the enabling being verified, enable operation of the vehicle using the authorized key device.

2. The system of claim 1, wherein the authorized key device is chosen from a key fob and a portable electronic device storing the electronic credential.

3. The system of claim 1, wherein the vehicle control system receives the electronic credential from the authorized key device when the authorized key device is brought into the predetermined proximity of and detected by the vehicle control system.

4. The system of claim 1, wherein the authorization control system verifies the insurance coverage of the authorized user by receiving and verifying information related to existing insurance coverage held by the authorized user covering operation of the vehicle by the authorized user at an insurance carrier system.

5. The system of claim 1, wherein the authorization control system verifies the insurance coverage of the authorized user by offering and receiving acceptance from the authorized user of insurance coverage covering operation of the vehicle by the authorized user at an insurance carrier system.

6. The system of claim 5, wherein the insurance carrier system is operable for charging the authorized user for the insurance coverage covering the operation of the vehicle by the authorized user.

7. A vehicle comprising:
   one or more computing devices associated with the vehicle and having non-transitory computer-readable media storing computer-executable instructions configured to cause the one or more computing devices to:
   at an authorization control system, receive a request from a user to allow an authorized user to operate the vehicle and, responsive to the request:
     verify insurance coverage of the authorized user and,
     responsive to the insurance coverage being verified, enable a device of the authorized user as an authorized key device by transmitting an electronic credential from the authorization control system to the device of the authorized user; and at a vehicle control system:
- receive, responsive to the authorized key device being brought within a predetermined proximity the vehicle, the electronic credential from the authorized key device,
- verify the enabling of the authorized key device based on the electronic credential, and,
- responsive to the enabling being verified, enable operation of the vehicle using the authorized key device.

8. The vehicle of claim 7, wherein the authorized key device is chosen from a key fob and a portable electronic device storing the electronic credential.

9. The vehicle of claim 7, wherein the vehicle control system receives the electronic credential from authorized key device when the authorized key device is brought into the predetermined proximity of and detected by the vehicle control system.

10. The vehicle of claim 7, wherein the authorization control system verifies the insurance coverage of the authorized user by receiving and verifying information related to existing insurance coverage held by the authorized user covering operation of the vehicle by the authorized user at an insurance carrier system.

11. The vehicle of claim 7, wherein the authorization control system verifies the insurance coverage of the authorized user by offering and receiving acceptance from the authorized user of insurance coverage covering operation of the vehicle by the authorized user at an insurance carrier system.

12. The vehicle of claim 11, wherein the insurance carrier system is operable for charging the authorized user for the insurance coverage covering the operation of the vehicle by the authorized user.

13. A computer-implemented method comprising:
at an authorization control system, receive a request from a user to allow an authorized user to operate a vehicle and, responsive to the request:
- verify insurance coverage of the authorized user and,
- responsive to the insurance coverage being verified, enable a device of the authorized user as an authorized key device by transmitting an electronic credential from the authorization control system to the device of the authorized user; and at a vehicle control system:
- receive, responsive to the authorized key device being brought within a predetermined proximity the vehicle, the electronic credential from the authorized key device,
- verify the enabling of the authorized key device based on the electronic credential, and,
- responsive to the enabling being verified, enable operation of the vehicle using the authorized key device.

14. The computer-implemented method of claim 13, wherein the authorized key device is chosen from a key fob and a portable electronic device storing the electronic credential.

15. The computer-implemented method of claim 13, wherein the vehicle control system receives the electronic credential from the authorized key device when the authorized key device is brought into the predetermined proximity of and detected by the vehicle control system.

16. The computer-implemented method of claim 13, wherein the authorization control system verifies the insurance coverage of the authorized user by receiving and verifying information related to existing insurance coverage held by the authorized user covering operation of the vehicle by the authorized user at an insurance carrier system.

17. The computer-implemented method of claim 13, wherein the authorization control system verifies the insurance coverage of the authorized user by offering and receiving acceptance from the authorized user of insurance coverage covering operation of the vehicle by the authorized user at an insurance carrier system.

18. The computer-implemented method of claim 17, wherein the insurance carrier system is operable for charging the authorized user for the insurance coverage covering the operation of the vehicle by the authorized user.

* * * * *